(12) United States Patent
Nasu (10) Patent No.: US 8,522,060 B2
(45) Date of Patent: Aug. 27, 2013

(54) COMPUTER SYSTEM, METHOD FOR CONTROLLING THE SAME, AND PROGRAM

(75) Inventor: Yasuyuki Nasu, Tokyo (JP)

(73) Assignee: NEC Corporation, Tokyo (JP)

( * ) Notice: Subject to any disclaimer, the term of this patent is extended or adjusted under 35 U.S.C. 154(b) by 669 days.

(21) Appl. No.: 12/698,578

(22) Filed: Feb. 2, 2010

(65) Prior Publication Data

US 2010/0229010 A1   Sep. 9, 2010

(30) Foreign Application Priority Data

Mar. 9, 2009  (JP) .................................. 2009-054678

(51) Int. Cl.
*G06F 1/32*  (2006.01)
*G06F 1/00*  (2006.01)
*G06F 1/26*  (2006.01)
*G06F 15/16*  (2006.01)

(52) U.S. Cl.
USPC ........... 713/320; 713/300; 713/323; 713/324; 709/201; 709/208; 709/248; 709/249

(58) Field of Classification Search
USPC ................. 713/300, 320, 323, 324; 709/201, 709/208, 248, 249
See application file for complete search history.

(56) References Cited

U.S. PATENT DOCUMENTS

| | | | |
|---|---|---|---|
| 7,568,115 B2 * | 7/2009 | Borkar et al. ................. | 713/300 |
| 8,051,309 B2 * | 11/2011 | Kashi et al. ................... | 713/310 |
| 8,055,882 B2 * | 11/2011 | Kashiwagi et al. ............. | 712/34 |
| 8,181,047 B2 * | 5/2012 | Lee ............................... | 713/320 |
| 2004/0268171 A1 * | 12/2004 | Inoue et al. ................... | 713/323 |
| 2009/0300396 A1 * | 12/2009 | Watanabe ...................... | 713/324 |
| 2010/0153686 A1 * | 6/2010 | Frank ............................. | 712/34 |

FOREIGN PATENT DOCUMENTS

| | | |
|---|---|---|
| JP | 9-91254 A | 4/1997 |
| JP | 10-283082 A | 10/1998 |
| JP | 2000348000 A | 12/2000 |
| JP | 2002197047 A | 7/2002 |
| JP | 2007310701 A | 11/2007 |
| JP | 2008225639 A | 9/2008 |

OTHER PUBLICATIONS

Japanese Office Action for JP2009-054678 issued Jan. 25, 2011.

* cited by examiner

*Primary Examiner* — Ji H Bae (57) ABSTRACT

A computer system 10 includes a plurality of nodes, a main memory device 41 and an input-output device 42 which both are shared between the nodes and which connect with any of the nodes, and a power control circuit 45. The plurality of nodes include a specific node 30 which connects neither with the main memory device 41 nor with the input-output device 42, and a normal node 20 which is a node other than the specific node 30. The power control circuit 45 controls the specific node 30 so that the specific node 30 transfers to a power-saving state which may reduce power consumption.

12 Claims, 8 Drawing Sheets

| DEVICE | STATE |
| --- | --- |
| NORMAL NODE 20 | NORMAL STATE |
| CPU21-1A | NORMAL STATE |
| CPU21-1B | NORMAL STATE |
| SPECIFIC NODE 30 | NORMAL STATE |
| CPU21-3A | NORMAL STATE |
| CPU21-3B | NORMAL STATE |

(b)

| DEVICE | STATE |
| --- | --- |
| NORMAL NODE 20 | NORMAL STATE |
| CPU21-1A | NORMAL STATE |
| CPU21-1B | NORMAL STATE |
| SPECIFIC NODE 30 | NORMAL STATE |
| CPU21-3A | POWER-SAVING STATE |
| CPU21-3B | NORMAL STATE |

(c)

| DEVICE | STATE |
| --- | --- |
| NORMAL NODE 20 | NORMAL STATE |
| CPU21-1A | NORMAL STATE |
| CPU21-1B | NORMAL STATE |
| SPECIFIC NODE 30 | NORMAL STATE |
| CPU21-3A | POWER-SAVING STATE |
| CPU21-3B | POWER-SAVING STATE |

(d)

| DEVICE | STATE |
| --- | --- |
| NORMAL NODE 20 | NORMAL STATE |
| CPU21-1A | NORMAL STATE |
| CPU21-1B | NORMAL STATE |
| SPECIFIC NODE 30 | NODE POWER-SAVING STATE |
| CPU21-3A | NORMAL STATE |
| CPU21-3B | NORMAL STATE |

Fig.8

COMPUTER SYSTEM, METHOD FOR CONTROLLING THE SAME, AND PROGRAM

This application is based upon and claims the benefit of priority from Japanese Patent Application No. 2009-054678, filed on Mar. 9, 2009, the disclosure of which is incorporated herein in its entirety by reference.

TECHNICAL FIELD

The present invention relates to a computer system, a controlling method and a program, in particular to a technology for reducing power consumption in a computer system having a plurality of nodes.

BACKGROUND ART

Japanese Patent Application Laid-Open No. 2000-348000 (patent document 1) discloses an example of a configuration of a multi-processor system sharing main memory. A system in the patent document 1 includes a plurality of nodes each of which has the same configuration. Each of the nodes includes a plurality of CPUs (Central Processing Units) and modules such as a cache module, a main memory module, an input-output module, a crossbar switch module, and the like. Each node connects with each other through its own crossbar switch module.

The system disclosed in the patent document 1 includes a plurality of CPUs. Therefore, the system may continue processes, even though the CPU transfers to a power-saving state after the system causes the CPU to be in an idle state according to a load state. The term "power-saving state" here is a state of the system which appears when the system stops supplying power and a clock signal to the CPU.

SUMMARY

An exemplary object of the present invention is to provide a computer system, a method for controlling the computer system, and a program which solve a problem that the system cannot fully reduce power consumption because a power-saving state of the system does not continue for a long time.

According to one exemplary aspect of the present invention, a first computer system includes a plurality of nodes each of which has a CPU and which are connected with each other, a main memory device and an input-output device which both are shared between the nodes and connect with any of the nodes, and a power control circuit. The plurality of nodes include a specific node which connects neither with the main memory device nor with the input-output device, and a normal node which is a node other than the specific node. The power control circuit controls the specific node so that the specific node transfers to a power-saving state in which power consumption may be reduced.

According to another exemplary aspect of the present invention, in a method for controlling the computer system, it is judged whether or not every CPU in the specific node which connect neither with the main memory device nor with the input-output device lies in the power-saving state, and the specific node is controlled so that the specific node transfers to the power-saving state, when every CPU in the specific node lies in the power-saving state.

According to another exemplary aspect of the present invention, a first recording medium stores thereon a program product causing a computer to execute a step of judging whether or not every CPU included in the specific node, which is a node that connects neither with the main memory device nor with the input-output device, lies in the power-saving state, and a step of controlling the specific node so that the specific node transfers to the power-saving state, when every CPU included in the specific node lies in the power-saving state.

BRIEF DESCRIPTION OF THE DRAWINGS

Exemplary features and advantages of the present invention will become apparent from the following detailed description when taken with the accompanying drawings in which.

EXEMPLARY EMBODIMENT

Figure 1:
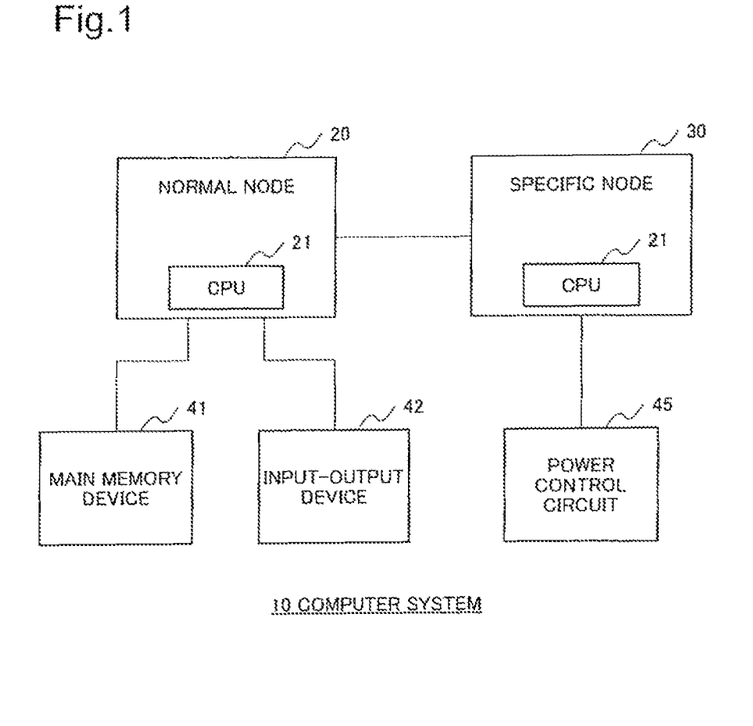
FIG. 1 is a block diagram illustrating a configuration according to a first exemplary embodiment of the present invention.

Referring to FIG. 1, a first exemplary embodiment of the present invention is described in detail. FIG. 1 is a diagram illustrating a basic configuration of a computer system 10 according to the exemplary embodiment. The computer system 10 includes a normal node 20, a specific node 30, a main memory device 41, an input-output device 42, and a power control circuit 45. FIG. 1 shows a configuration in which the computer system 10 includes one normal node 20 and one specific node 30. However, more than one normal node 20 may be included in the computer system 10 and/or more than one specific node 30 may be included therein. The number of the nodes included in the computer system 10 is not limited.

Each of the normal node 20 and the specific node 30 includes a CPU 21. The normal node 20 and the specific node 30 connect with each other. The main memory device 41 and the input-output device 42 connect with the normal node 20. The main memory device 41 and the input-output device 42 are shared between the normal node 20 and the specific node 30. The specific node 30 connects neither with the main memory device 91 nor with the input-output device 42. The input-output device 42 usually includes more than one type of input-output devices. The main memory device 41 may also include more than one type of main memory devices.

In the configuration shown in FIG. 1, the normal node 20 connects with both the main memory device 41 and the input-output device 42. When the normal node 20 is configured to connect with either the main memory device 91 or the input-output device 42, the main memory device 41 connects with one or more of the normal nodes 20 in the computer system 10, and the input-output device 42 connects with one or more of the other normal nodes 20 therein.

In the configuration shown in FIG. 1, the power control circuit 45 controls the specific node 30 so that the specific node 30 transfers to the power-saving state in which power consumption may be reduced. The specific node 30 connects neither with the main memory device 41 nor with the input-output device 42. Therefore, normal access to the specific node 30 in the power-saving state does not occur. The normal access does not include access such as instructions for cancelling a node power-saving state. Therefore, the computer system 10 of the exemplary embodiment may sufficiently reduce power consumption by keeping, for a long time, the power-saving state in which power consumption of the specific node 30 may be reduced.

Restoration from the power-saving state generally needs a long period of time. Therefore, if an outside device accesses a node in the power-saving state, response time get remarkably delayed, and performance of a computer system degrades. Meanwhile, the computer system 10 in the exemplary embodiment does not cause the normal node 20 to be in the power-saving state. Therefore, even if access to the normal node 20 in the computer system 10 occurs, delay of the response time due to restoration from the power-saving state may be avoided. Since the normal access to the specific node 30 does not occur, the delay of the response time does not occur. Therefore, performance degradation of the computer system 10 in the exemplary embodiment may be avoided.

Figure 2:
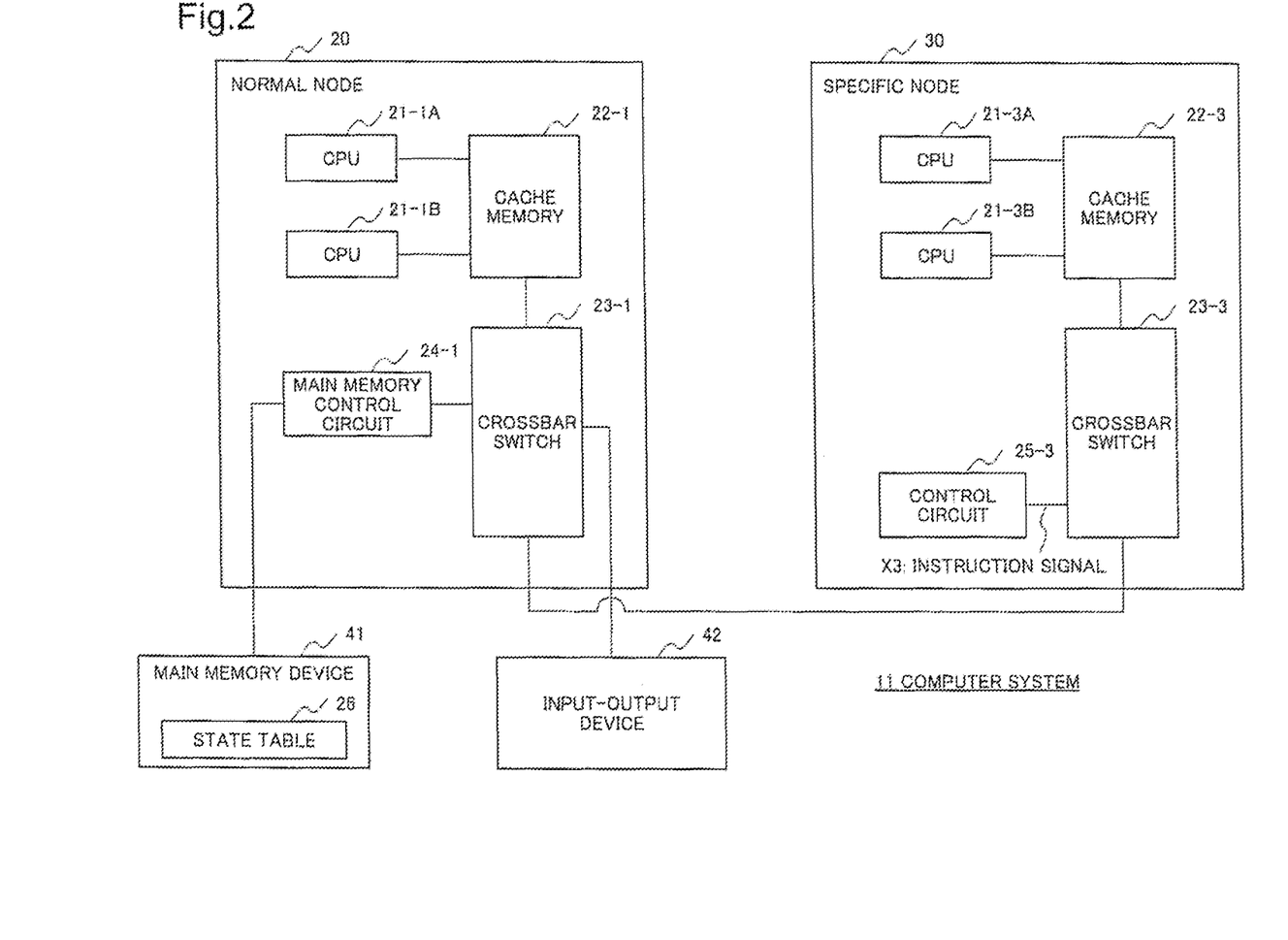
FIG. 2 is a block diagram illustrating a configuration according to a second exemplary embodiment of the present invention.

Next, referring to FIG. 2, a second exemplary embodiment of the present invention is described in detail. FIG. 2 is a diagram illustrating a configuration of a computer system 11 according to the exemplary embodiment. The computer system 11 is a more detailed configuration of the computer system 10 in FIG. 1. The computer system 11 includes the normal node 20 and the specific node 30. The normal node 20 connects with both the main memory device 41 and the input-output device 42. The specific node 30 connects neither with the main memory device 41 nor with the input-output device 42. In FIG. 2, an element which is common to the computer system 10 in FIG. 1 and the computer system 11 is denoted by the same reference numeral.

The main memory device 41 and the input-output device 42 are shared in the computer system 11. The main memory device 41 and the input-output device 42 are shared between all the nodes (the normal node 20 and the specific node 30 in FIG. 2) in the computer system 11. The computer system 11 shown in FIG. 2 includes two nodes, i.e. the normal node 20 and the specific node 30. However, the number of the nodes included in the computer system 11 is not limited. The numbers of the normal nodes 20 and the specific nodes 30 in the computer system 11 may be optionally determined.

The normal node 20 includes two CPUs (Central Processing Units) 21-1, a cache memory 22-1, a main memory control circuit 24-1, and a crossbar switch 23-1. More specifically, the "two CPUs" means a CPU 21-1A and a CPU 21-1B. The main memory control circuit 24-1 controls an interface of the main memory device 41. The crossbar switch 23-1 switches connections between the cache memory 22-1, the main memory control circuit 24-1, the input-output device 42, and another node. In the configuration in FIG. 2, the "another node" means the specific node 30. The normal node 20 connects with both the main memory device 41 and the input-output device 42.

The specific node 30 includes two CPUs 21-3, a cache memory 22-3, a crossbar switch 23-3, and a control circuit 25-3. In the configuration shown in FIG. 2, "two CPUs 21-3" means a CPU 21-3A and a CPU 21-3B. The crossbar switch 23-3 switches connection between the cache memory 22-3 and another node. In the configuration in FIG. 2, "another node" means the normal node 20. The control circuit 25-3 controls power supply to the node and reset. The specific node 30 connects neither with the main memory device 41 nor with the input-output device 42.

Since both the CPU 21-1 and the CPU 21-3 include the same function and the same configuration, the same reference numeral "21" is used. When the CPU 21-1 and the CPU 21-3 are explained without distinction, "CPU 21" is used instead. The same is true for "cache memory 22", "crossbar switch 23" and "main memory control circuit 24". When the CPU 21-1A and the CPU 21-1B are explained below without distinction, "CPU 21-1" is used instead. The same is true for "CPU 21-3". When the normal node 20 and the specific node 30 are explained without distinction, "node" is used instead.

The CPU 21 executes a program stored in the main memory device 41. Each of the CPU 21-1A, the CPU 21-1B, the CPU 21-3A, and the CPU 21-3B has the same specification. The CPU 21 may include CPUs having specifications which differ from each other. The CPU 21-1 accesses the main memory device 41 through the cache memory 22-1, the crossbar switch 23-1, and the main memory control circuit 24-1. The CPU 21-1 accesses the input-output device 42 and the specific node 30 through the cache memory 22-1 and the crossbar switch 23-1. The cache memory 22 may be bypassed according to access contents.

Meanwhile, the CPU 21-3 accesses the main memory device 41 through the cache memory 22-3, the crossbar switch 23-3, the crossbar switch 23-1, and the main memory control circuit 24-1. The CPU 21-1 accesses the input-output device 42 and the specific node 30 through the cache memory 22-3, the crossbar switch 23-3, and the crossbar switch 23-1.

The cache memory 22 temporarily stores data of the main memory device 41. If the CPU 21 includes a primary cache, the cache memory 22 functions as a secondary cache. A high-speed RAM (Random Access Memory) is usually used as the cache memory 22 so that the cache memory 22 is accessed faster than the main memory device 41. In the specific node 30, access to the main memory device 41 is delayed compared with the normal node 20. However, if the specific node 30 includes the cache memory 22-3, the access delay is improved.

The crossbar switch 23 is a circuit for switching connection. The crossbar switch 23 may transfer data in a predetermined transfer unit by switching connection once. The length of the transfer unit may be fixed or be variable. The transfer unit may be a form such as a packet for communication. If the crossbar switch 23-1 switches connection so as to connect the cache memory 22-1 and the main memory control circuit 24-1, access from the CPU 21-1A (or CPU 21-1B) to the main memory device 41 becomes possible. If the crossbar switch 23-1 switches connection so as to connect the cache memory 22-1 and the crossbar switch 23-3, access from the CPU 21-1A (or CPU 21-1B) to the specific node 30 becomes possible.

The crossbar switch 23 includes a restoration circuit (not shown), which is operable by receiving power and a clock signal even if the specific node 30 lies in the power-saving state. The restoration circuit receives, from another node, instructions for transferring to the power-saving state or instructions for being restored therefrom, decodes the instructions, and sends the instructions to the control circuit 25. Functions of the restoration circuit and the control circuit 25 may be performed by the power control circuit 45 of the computer system 10 shown in FIG. 1.

The main memory control circuit 24 connects with both the crossbar switch 23 and the main memory device 41. The main memory control circuit 24 controls the interface of the main memory device 41.

The specific node 30 includes the control circuit 25. The control circuit 25 controls on-off operation of a power source supplying the node with power, according to an instruction signal Xn (n=2, 3, 4) outputted by the crossbar switch 23. The control circuit 25 may control, by receiving power and the clock signal, the on-off operation of the power source supplying the node with power, even when the specific node 30 lies in the power-saving state.

Figure 3:
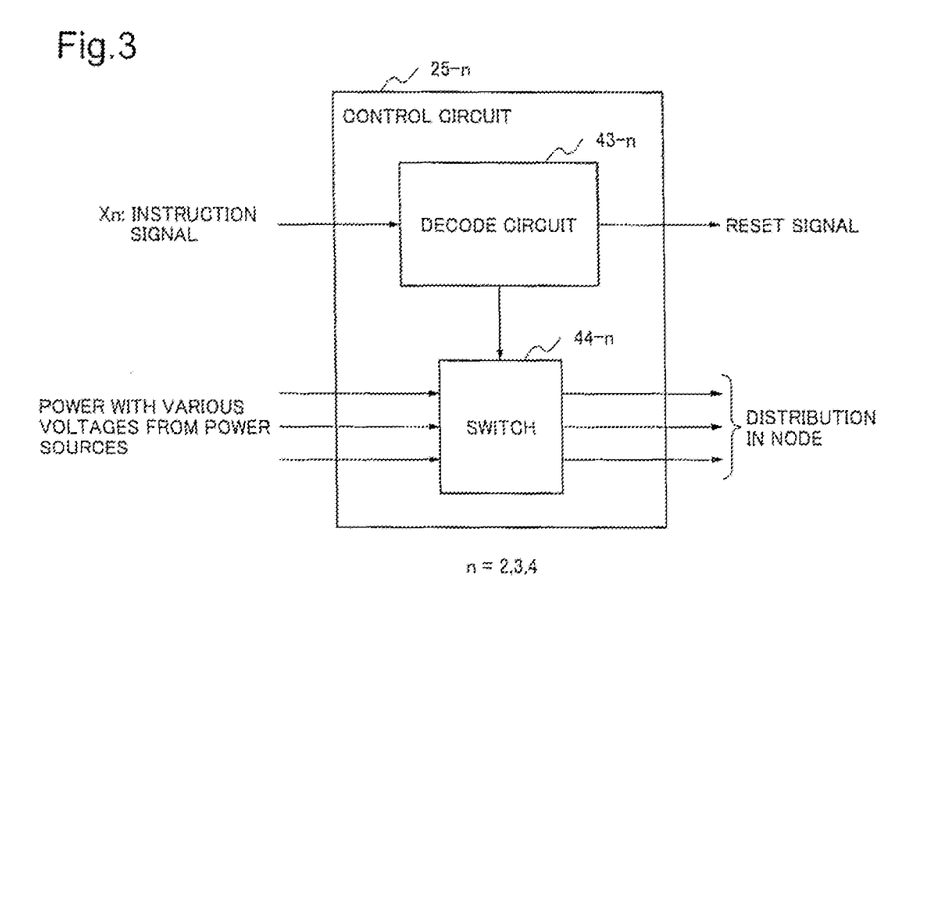
FIG. 3 is a block diagram illustrating a configuration of a control circuit 25 according to an exemplary aspect of the present invention.

FIG. 3 is a block diagram illustrating a configuration of the control circuit 25. Referring to FIG. 3, the control circuit 25 includes a decode circuit 43 for decoding the instruction signal Xn and a switch 44. The switch 44 performs the on-off operation of the power source supplying the node with power on and off, according to instructions of the decode circuit 43. In the configuration in FIG. 2, the control circuit 25 is separated from the other elements in the node. However, the control circuit 25 may be included in the crossbar switch 23, the CPU 21, or other element.

The main memory device 41 stores a program, data which is accessed according to the program, various control information. The main memory device 41 is configured by a volatile semiconductor device such as a DRAM (Dynamic Random Access Memory). In the configuration in FIG. 2, the single main memory device 41 is included in the computer system 11. However, a plurality of main memory devices 41 may be arranged therein.

Figure 4:
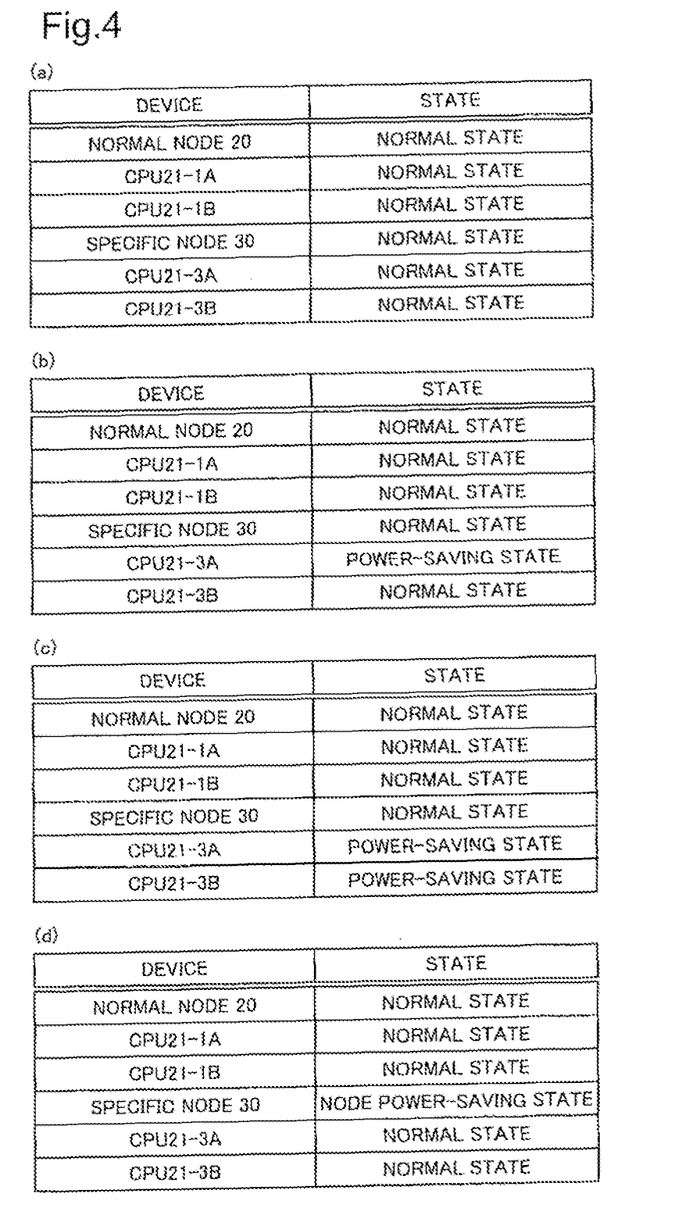
FIG. 4(a) is a block diagram illustrating contents of a state table 26 according to an exemplary aspect of the present invention.
FIG. 4(b) is a block diagram illustrating contents of a state table 26 according to an exemplary aspect of the present invention.
FIG. 4(c) is a block diagram illustrating contents of a state table 26 according to an exemplary aspect of the present invention.
FIG. 4(d) is a block diagram illustrating contents of a state table 26 according to an exemplary aspect of the present invention.

A state table 26 indicates whether elements (CPU 21 and node) in the computer system 11 lie in a normal state or in the power-saving state. FIG. 4 illustrates examples of contents in the state table 26. Details of the state table are described in following descriptions on operations. In the exemplary embodiment, the state table 26 is arranged in the main memory device 41. A memory device other than the main memory device 41 may include the state table 26, if the CPU 21 is able to access the state table 26.

The input-output device 42 is an input-output subsystem including an auxiliary memory device, an input device, an output device, a display device, and a communication device. More specifically, the auxiliary memory device is a magnetic disc device or the like. The input device is a keyboard, a mouse, or the like. The output device is a printer, or the like. The communication device is an input-output device communicating with the outside of the system. The input-output subsystem usually includes a control device for controlling each of the input-output devices. The input-output subsystem usually connects with the crossbar switch 23 through the control device. The normal node 20 may include the control device.

The CPU 21 includes a circuit performing a power-saving function. The power-saving function generates the power-saving state in which the computer system 11 may reduce power consumption. In the CPU 21, state transition between the normal state and the power-saving state occurs according to instructions from the outside thereof. The power-saving function means, for example, a function to stop supplying power and clocks to a predetermined circuit according to instructions of any of CPUs 21, and a function for controlling the state transition between the normal state and the power-saving state according thereto. The predetermined circuit may be most circuits other than some circuits performing the power-saving function, and may be a high-power-consumption circuit.

A state in which only the CPU 21-1A lies in the power-saving state is called an individual power-saving state. A node in the individual power-saving state lies in the normal state. A state in which all the nodes lie in the power-saving state is called a node power-saving state. The node power-saving state means, for example, a state of a node which is supplied with no power. The descriptions above do not limit specific contents of each state. In following descriptions, however, the node power-saving state means the state of the node which is supplied with no power.

A diagnostic control device, being termed a service processor or a diagnostic processor, that controls start of a system or maintenance diagnosis, is well-known. The diagnostic control device includes a power control circuit and a reset circuit which control power supply on a part-by-part basis or on a device-by-device basis, as a part of a system starting circuit usually included in a system. Therefore, a computer system having the diagnostic control device may use the diagnostic control device as the power control circuit 45. In the exemplary embodiment, how to configure the power control circuit 45 is not limited.

Referring to drawings, operations in the second exemplary embodiment of the invention are described in detail. Software having a function for allocating a process to the CPU 21, such as an OS (Operation System), controls the CPU 21 so that the CPU 21 transfers to the power-saving state. The process means a processing unit in execution of a program. In a virtual computer system, a virtual computer monitor device, having a function for allocating a virtual computer to the CPU 21, controls the CPU 21 so that the CPU 21 transfers to the power-saving state. Usually, the OS and the virtual computer monitor device include a plurality of own processes. A part of the OS or a part of the virtual computer monitor device, which controls allocation of the processes or the virtual computer, is called an allocation control circuit. In following descriptions, the allocation control circuit operates on the CPU 21-1A.

Allocating the process to the CPU 21, the allocation control circuit allocates more processes to the CPU 21-1 in the normal node 20 than to the CPU 21-3 in the specific node 30. That is, the allocation control circuit allocates the processes to the CPU 21 so that the number of the processes operating on the CPU 21-3 in the specific node 30 is less than the number of the processes operating on the CPU 21-1 in the normal node 20.

If the number of the processes operating in whole of the computer system 11 decreases, the CPU 21 arises, in which the number of the processes to be processed becomes "0" (i.e. idle state). In this situation, if the computer system 11 controls the CPU 21 so that the CPU 21 transfers to the power-saving state, the computer system 11 may reduce power consumption significantly. Some programs which operate in the allocation control circuit, or operate in the idle state are not includes in the processes above-mentioned.

The allocation control circuit allocates the processes so that the number of the processes operating on the CPU 21-3 in the specific node 30 is less than the number of the processes operating on the CPU 21-1 in the normal node 20. Allocating the processes in this way, the allocation control circuit may put the CPU 21-3 in the specific node 30 into the idle state prior to the CPU 21-1 in the normal node 20.

Figure 5:
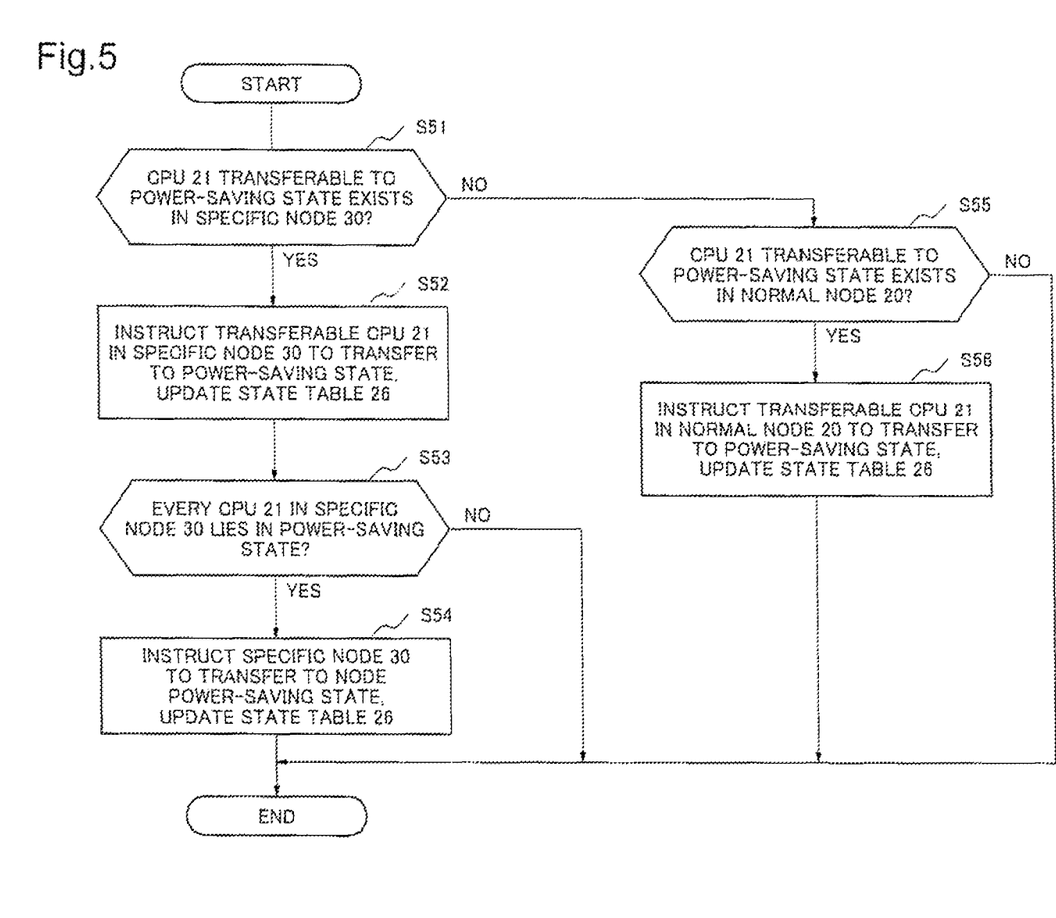
FIG. 5 is a flowchart illustrating operations of transferring to a power-saving state according to an exemplary aspect of the present invention.

Referring to FIG. 5, operations of transferring to the power-saving state are described in detail. FIG. 5 is a flowchart showing operations transferring the CPU 21 and the specific node 30 to the power-saving state.

The allocation control circuit sees whether or not the specific node 30 includes the CPU 21 which is transferable to the power-saving state, when one process is completed (step S51). An event other than the process completion may trigger the step S51. The allocation control circuit may perform steps shown in FIG. 5 at regular time intervals.

The allocation control circuit determines that the CPU 21 is transferable, if the CPU 21 lies in the idle state. The allocation control circuit determines that the CPU 21 which is transferable to the power-saving state exists, if at least one of the CPU 21-3A and the 21-3B lies in the idle state. The allocation control circuit may start to perform the step S51 at regular time intervals.

If the specific node 30 includes the CPU 21-3 which is transferable to the power-saving state ("Yes" in step S51), the allocation control circuit sends instructions for transferring to the power-saving state to the CPU 21-3 which is transferable to the power-saving state in the specific node 30 (step S52). The allocation control circuit updates the state table 26 so that the state of the CPU 21-3 which transfers to the power-saving state changes from the normal state to the power-saving state.

When the allocation control circuit sends, from the CPU 21-1A, instructions for transferring to the power-saving state, the instructions reach the CPU 21-3A through the cache memory 22-1, the crossbar switch 23-1, the crossbar switch 23-3, and the cache memory 22-3. The CPU 21-3A receives the instructions for transferring to the power-saving state, and transfers from the normal state to the power-saving state by starting the installed power-saving function. In this case, since contents of data sent by the allocation control circuit are instructions for transferring, the cache memory 22-1 and the cache memory 22-3 are bypassed in practice.

Next, the allocation control circuit checks whether or not all of the CPUs 21-3 in the specific node 30 lie in the power-saving state (step S53). If all of the CPUs 21-3 in the specific node 30 do not lie in the power-saving state ("No" in step S53), the allocation control circuit ends operations shown in FIG. 5 and returns to an initial state. If all of the CPUs 21-3 in the specific node 30 lie in the power-saving state ("Yes" in step S53), the allocation control circuit sends, to the specific node 30, instructions for transferring to the node power-saving state (step S54).

Then, the allocation control circuit updates the state table 26 so that information indicating the state of the specific node 30 which transfers to the node power-saving state changes from the normal state to the node power-saving state. The allocation control circuit judges whether or not all of the CPUs 21-3 in the specific node 30 lie in the power-saving state, by referring to the state table 26.

The allocation control circuit in the CPU 21-1A sends, to the specific node 30, the instructions for transferring to the node power-saving state. The crossbar switch 23-3 receives the instructions for transferring to the node power-saving state through the cache memory 22-1 and the crossbar switch 23-1. In this case, since the contents of the data sent by the allocation control circuit are the instructions for transferring, the cache memory 22-1 is bypassed in practice.

Decoding that the transfer unit received by the crossbar switch 23-3 is the instructions for transferring to the node power-saving state, the restoration circuit in the crossbar switch 23-3 instructs the control circuit 25-3 to stop supplying power. Receiving the instructions for stopping supplying power, the decode circuit 43 in the control circuit 25-3 stops supplying power to the specific node 30, by operating the switch 44.

As mentioned above, the control circuit 25-3 stops supplying power to the specific node 30. Therefore, in the specific node 30, supplying power not only to the CPU 21-3 but also to the cache memory 22-3 and the crossbar switch 23-3 is stopped. Therefore, power consumption is reduced substantially in the computer system 11.

When the specific node 30 does not includes the CPU 21-3 which is transferable to the power-saving state ("No" in step S51), the allocation control circuit checks whether or not the normal node 20 includes the CPU 21 which is transferable to the power-saving state (step S55). If the normal node 20 does not include the CPU 21 which is transferable to the power-saving state ("No" in step S55), the allocation control circuit completes operations shown in FIG. 5 and returns to the initial state.

If the normal node 20 includes the CPU 21-1 which is transferable to the power-saving state ("Yes" in step S55), the allocation control circuit instructs the transferable CPU 21-1 in the normal node 20 to transfer to the power-saving state (step S56). Then, the allocation control circuit updates the state table 26 so that information indicating the state of the CPU 21-1 which transfers to the power-saving state changes from the normal state to the power-saving state.

For example, when the CPU 21-1B transfers to the idle state, the allocation control circuit sends, to the CPU 21-1B, instructions for transferring to the power-saving state. The CPU 21-1B receives the instructions, and starts the installed power-saving function to transfer from the normal state to the power-saving state.

Since the allocation control circuit does not instruct the normal node 20 to transfer to the node power-saving state, operations corresponding to steps S53 and S54 are not performed. The reason is that since the normal node 20 connects with the main memory device 41 and the input-output device 42, access to the normal node 20 from the other node occurs frequently, and the node power-saving state thereof does not last for a long time.

Including a plurality of the normal nodes 20, for example, the computer system 11 may control the main memory device 41 and the input-output device 42 so that the main memory device 41 and the input-output device 42, connected with any of the normal nodes 20, stop operations. Accordingly, the state of the normal node 20 that connected with the main memory device 41 and the input-output device 42 may become the same as that of the specific node 30. In this case, the computer system 11 may put the normal node 20 into the node power-saving state. When the allocation control circuit performs operations corresponding to the steps S53 and S54 for the normal node 20 just as for the specific node 30, the normal node 20 may easily transfer to the node power-saving state.

Next, operations for transferring to the power-saving state are described by using an example. In the example, the CPU 21-3A and the CPU 21-3B transfer to the idle state in order, and the specific node 30 transfers to the node power-saving state. An initial state is a state indicated by the state table 26 shown in FIG. 4(*a*). That is, all of the CPUs 21 and the nodes lie in the normal state.

When processes operating on the CPU 21-3A are completed and the CPU 21-3A transfers to the idle state, the allocation control circuit determines that the CPU 21-3A is the CPU 21 which is transferable to the power-saving state ("Yes" in step S51). The allocation control circuit sends, to the CPU 21-3A, instructions for transferring to the power-saving state (step S52). On reception of the instructions, the CPU 21-3A transfers to the power-saving state.

The allocation control circuit updates the state table 26 so that information indicating the state of the CPU 21-3A changes from the normal state to the power-saving state. As a result, the state table 26 changes into contents shown in FIG. 4 (b). Since the CPU 21-3B lies in the normal state, the allocation control circuit determines all of the CPUs 21 do not lie in the power-saving state ("No" in step S53). The allocation control circuit completes the operations shown in FIG. 5.

When the number of the processes decreases and the CPU 21-3B transfers to the idle state, the allocation control circuit determines that the CPU 21-3B is the CPU 21 which is transferable to the power-saving state ("Yes" in step S51). The allocation control circuit sends, to the CPU 21-3B, instructions for transferring to the power-saving state (step S52). On reception of the instructions, the CPU 21-3B transfers to the power-saving state.

The allocation control circuit updates the state table 26 so that information indicating the state of the CPU 21-3B changes from the normal state to the power-saving state. As a result, the state table 26 changes into contents shown in FIG. 4(c). Since both the CPU 21-3A and the CPU 21-3B lie in the power-saving state, in the state table 26 at the time, the allocation control circuit determines that all the CPUs 21 lie in the power-saving state ("Yes" in step S53).

The allocation control circuit subsequently sends, to the specific node 30, instructions for transferring to the node power-saving state (step S54). The crossbar switch 23-3 in the specific node 30 receives the instructions. The restoration circuit in the crossbar switch 23-3 decodes the instructions. The restoration circuit sends instructions for stopping supplying power, to the control circuit 25-3, by using an instruction signal X3. On reception of the instructions for stopping supplying power by the instruction signal X3, the control circuit 25-3 controls the switch 44 to stop supplying power supplied to the specific node 30.

The allocation control circuit updates the state table 26 so that information indicating the state of the specific node 30 changes from the normal state to the node power-saving state. As a result, the state table 26 changes into contents shown in FIG. 4(d). Accordingly, the specific node 30 transfers to the node power-saving state and power consumption of the specific node 30 is substantially reduced.

In the descriptions above, operations for transferring to the power-saving state are described based on the example that the node power-saving state is a state in which a power source of each element in the node is turned off. However, the node power-saving state may be defined as a low-voltage state or a clock-signal-stopping state while being in a power-on state. In this case, the above operations may be performed, if the switch 44 for turning the power source off is replaced by a circuit for controlling voltage supplied to each element above described or by a circuit for stopping clocks supplied thereto.

Figure 6:
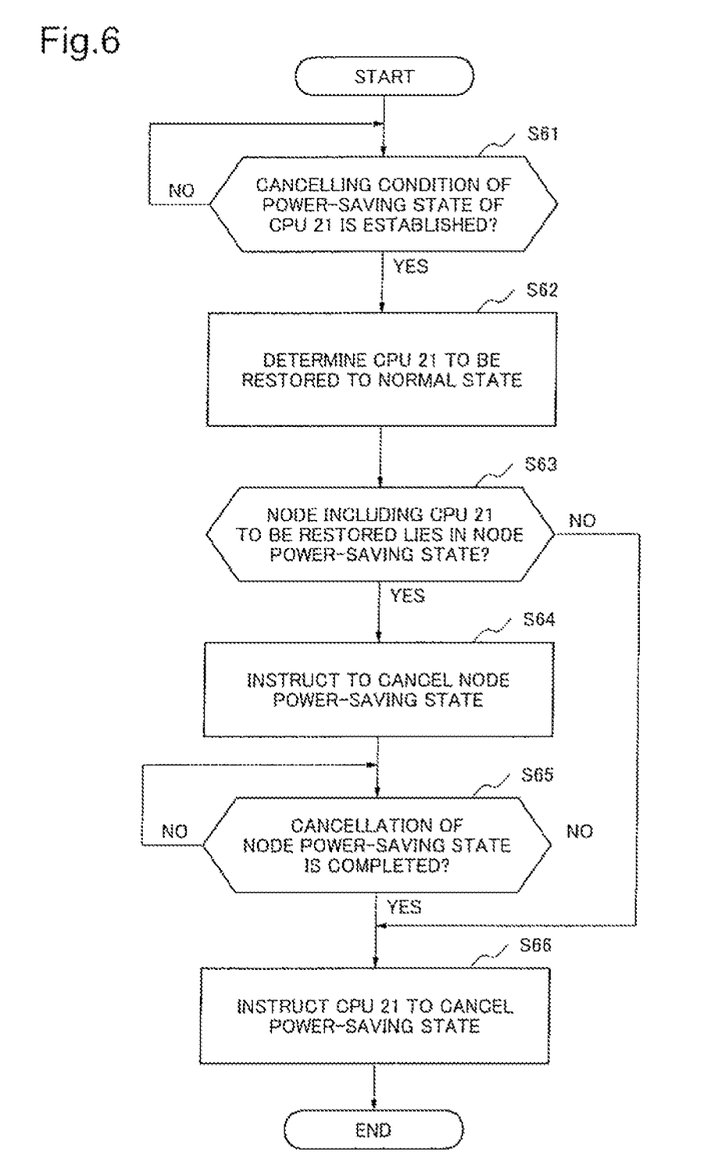
FIG. 6 is a flowchart illustrating operations of restoration from the power-saving state according to an exemplary aspect of the present invention.

Next, operations for being restored from the power-saving state, that is, operations for being transferred from the power-saving state to the normal state are described below. When the number of the processes increases and a predetermined condition is satisfied in the computer system 11, the allocation control circuit determines that conditions for cancelling the power-saving state are established (step S61). The predetermined conditions mean, for example, that at least one CPU 21 in the power-saving state is found, and load of the CPU 21 in the normal state exceeds a given value. That is, when process operations are delayed or the delay thereof is expected unless the CPU 21 in the power-saving state is restored to the normal state, the conditions for cancelling the power-saving state are established. The conditions for cancelling the power-saving state is not limited to the above case, and different conditions are possible.

When the conditions for cancelling the power-saving state are established (Yes in step S61), the allocation control circuit selects the CPU 21 which is controlled to be restored to the normal state, according to predetermined procedures (step S62). The procedures are not limited to specific ones. The allocation control circuit cancels the power-saving state of the CPU 21 in the normal node 20 prior to that of the CPU 21 in the specific node 30. The allocation control circuit cancels the power-saving state of the CPU 21 in the specific rode 30 lying in the normal state, prior to that of the CPU 21 in the specific node 30 lying in the node power-saving state.

By referring to the state table 26, the allocation control circuit checks whether or not the node, including the CPU 21 which is controlled to be restored to the normal state, lies in the node power-saving state (step S63). If the node including the CPU 21 to be restored to the normal state lies in the node power-saving state ("Yes" in step S63), the allocation control circuit sends instructions for cancelling the node power-saving state, to the node including the CPU 21 which is controlled to be restored to the normal state (step S64).

The restoration circuit in the crossbar switch 23-3 receives the instructions for cancelling the node power-saving state. The restoration circuit decodes the instructions and sends restoration instructions to the control circuit 25 by using the instruction signal X3. The control circuit 25 decodes the restoration instructions which are sent with the instruction signal X3 by using the decode circuit 43, and controls the switch 44 to resume supplying power. The control circuit 25 outputs a reset signal to put the node into the normal state.

At this time, the CPU 21 stores whether the state of the CPU 21 is the normal state or the power-saving state, in a non-volatile memory device in a predetermined circuit performing the power-saving function. In this case, the CPU 21 is supplied with power. On reception of the reset signal, the CPU 21 is restored to a state before power-off. If the CPU 21 includes no non-volatile memory device, the control circuit 25 may supply power to only a circuit storing a state even if the node lies in the node power-saving state. The CPU 21 may stores the state thereof in a circuit outside the CPU 21, for example, the control circuit 25. The circuit outside the CPU 21 may be configured to send an initial state to the CPU 21 at the time of restoration.

Next, the allocation control circuit confirms completion of cancelling the node power-saving state ("Yes" in step S65). After that, the allocation control circuit sends instructions for cancelling the power-saving state, to the CPU 21 which is controlled to be restored to the normal state (step S66). On reception of the instructions for cancelling the power-saving state, the CPU 21 starts the installed power-saving function to be restored to the normal state.

If the node including the CPU 21 which is controlled to be restored to the normal state does not lie in the node power-saving state ("No" in step S63), the allocation control circuit sends the instructions for cancelling the power-saving state to the CPU 21 which is controlled to be restored to the normal state (step S66). On reception of the instructions, the CPU 21 starts the installed power-saving function to be restored to the normal state.

After the CPU 21 is restored to the normal state as mentioned above, the allocation control circuit may allocate processes to the restored CPU 21. Since newly generated processes are allocated to the restored CPU 21, load of a highly-loaded CPU 21 may be reduced.

Since the specific node 30 in the exemplary embodiment does not connect with both the main memory device 41 and the input-output device 42, the normal access to the specific node 30 in the node power-saving state does not occur. In the exemplary embodiment, therefore, the node power-saving state of the specific node 30 advantageously continues for a long time.

Restoration from the power-saving state generally needs a long period of time. If an outside device accesses a node in a node power-saving state, response time thereof becomes remarkably long. Therefore, performance of a computer system including the node is degraded. The computer system 21 of the exemplary embodiment does not put the normal node 20 into the power-saving state. The computer system 11 of the exemplary embodiment, therefore, may avoid generation of a delayed response time due to restoration from the power-saving state, with respect to access to the normal node 20. Since the normal access to the specific node 30 does not occur, the response time is not delayed. Therefore, the computer system 11 of the exemplary embodiment may avoid performance degradation.

Figure 7:
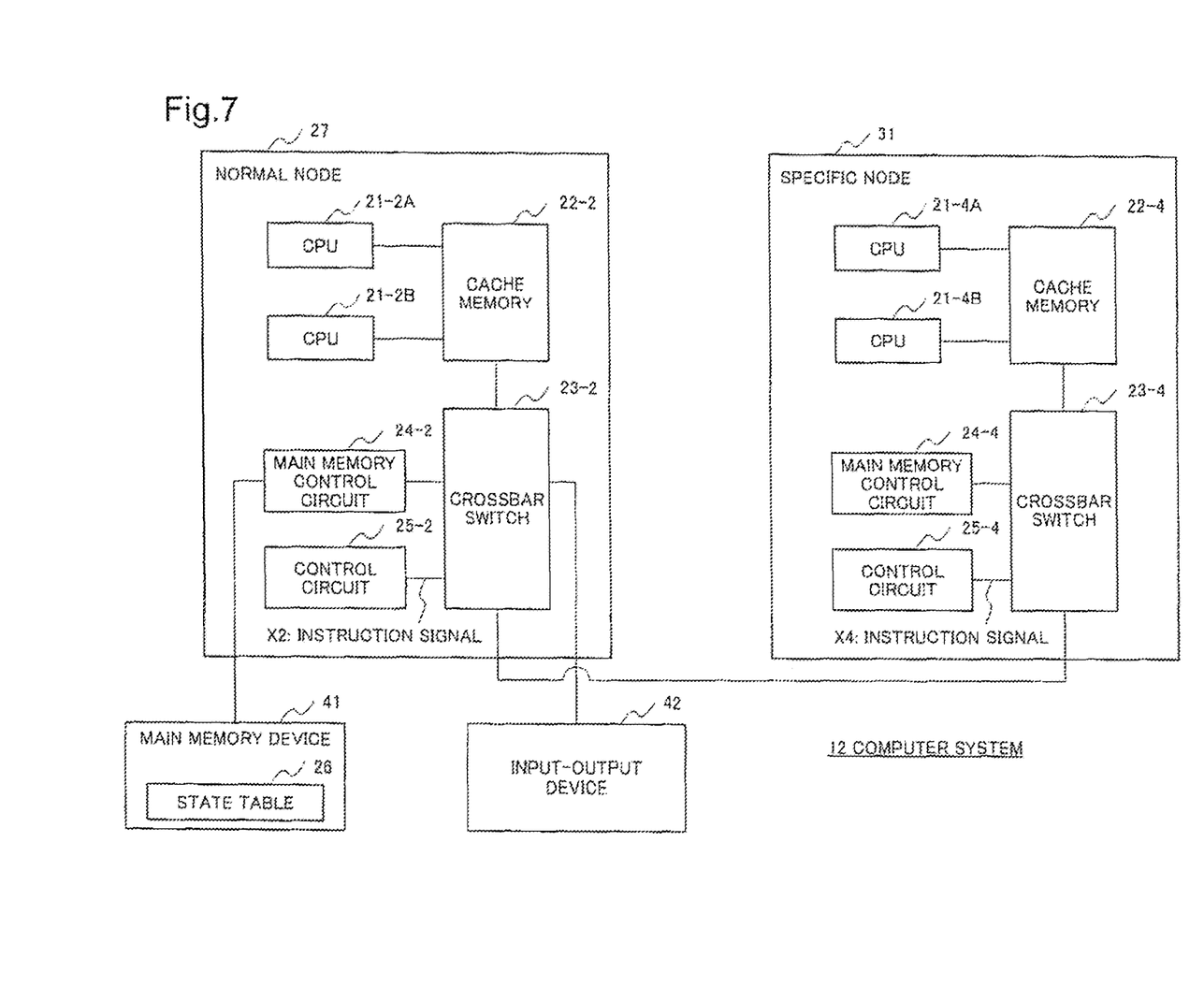
FIG. 7 is a block diagram illustrating a configuration according to a third exemplary embodiment of the present invention.

Referring to FIG. 7, a third exemplary embodiment of the invention is described in detail. FIG. 7 illustrates a configuration of a computer system 12 according to the third exemplary embodiment. In FIG. 7, elements having the same function as the computer system 11 are denoted by the same reference numeral as the computer system 11. Differences from the computer system 11 are described below.

In the computer system 12, the normal node 20 of the computer system 11 is replaced by a normal node 27, and the specific node 30 thereof is replaced by a specific node 31. The computer system 12 is characterized in that an inner configuration of the normal node 27 is the same as that of the specific node 31.

The normal node 27 includes a configuration in which a control circuit 25-2 is added to the normal node 20. The other elements in the normal node 27 are the same as those in the normal node 20. Therefore, descriptions on the other elements are omitted. The control circuit 25-2 and the control circuit 25-3 include the same configuration. Though the normal node 27 includes the control circuit 25-2, the normal node 27 is not instructed to transfer to the node power-saving state. Accordingly, the normal node 27 operates as the normal node 20 does. The normal node 27 may be configured to be inhibited from transferring to the node power-saving state.

The specific node 31 includes a configuration in which a main memory control circuit 24-4 is added to the specific node 30. The other elements in the specific node 31 are the same as those in the specific node 30. Therefore, descriptions on the other elements are omitted. Though the specific node 31 includes the main memory control circuit 24-4, the specific node 31 does not connect with the main memory device 41. Therefore, the main memory control circuit 24-4 does not work. Accordingly, the specific node 31 operates as the specific node 30 does.

The normal node 27 operates as the normal node 20 does, and the specific node 31 operates as the specific node 30 does. Accordingly, the computer system 12 operates as the computer system 11 does. Therefore, descriptions on the operations are omitted.

Since the same hardware is used in both the normal node 27 and specific node 31 in the computer system 12 of the exemplary embodiment, maintenance parts are available for both the nodes. Therefore, maintenance cost may be reduced.

The normal node 27 and specific node 31 each having the same hardware may include a switch. In the computer system 12, when the hardware is utilized as the specific node 31, the switch is controlled to stop supplying power to the main memory control circuit 24-4. When the hardware is utilized as the normal node 27, the switch is controlled to stop supplying power to the control circuit 25-2. The computer system 12 having above configurations may further reduce power consumption.

Figure 8:
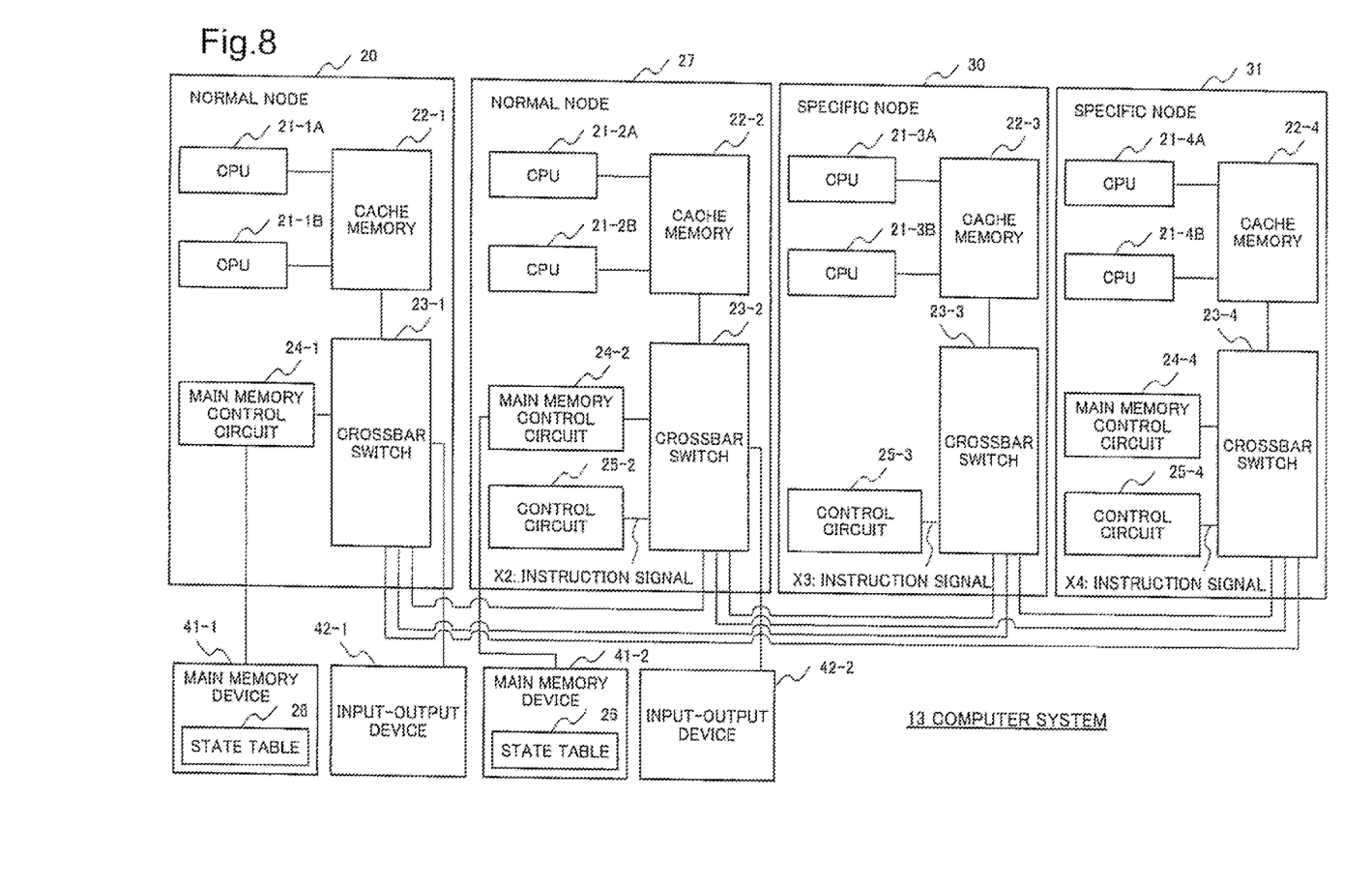
FIG. 8 is a block diagram illustrating a configuration according to the third exemplary embodiment of the present invention.

FIG. 8 shows a computer system 13 including the normal node 20, the normal node 27, the specific node 30, and the specific node 31. It is readily understandable that even if the normal nodes 20 and 27 are arranged together, and the specific nodes 30 and 31 are arranged together, the computer system 13 operates as the computer system 11 does. The computer system 13 includes two normal nodes. Therefore, in the computer system 13, if a main memory device 91-1 and an input-output device 42-2 which connect with the normal node 27 may be logically disconnected, the normal node 27 may be controlled as the specific node 31.

The third exemplary embodiment definitely achieves the same result as the second exemplary embodiment. If the same parts are used in the specific node 31 and the normal node 27, maintenance cost in the third exemplary embodiment may be reduced.

In the descriptions above, the element, that is, the allocation control circuit, which functions when the program controls the computer, conducts all operations of the steps S51 to S55, and S61 to S66. However, a part of the operations may be performed by hardware. For example, if the computer system 12 includes a circuit (hereinafter, automatic transfer circuit) which monitors a state of each CPU 21 in each node therein, and which controls the node to transfer to the node power-saving state when all the CPUs 21 in the node lies in the power-saving state, a part of the above operations may be performed. The automatic transfer circuit may be included, for example, in one of the control circuit 25 and the CPU 21. In this case, the power-saving function in the CPU 21 may obtain the state of the CPU 21.

In the third exemplary embodiment, when both the normal node 20 and the specific node 30 include the same inside configuration, the computer system 12 may include a switch for selecting whether or not the automatic transfer circuit is enabled. Therefore, the computer system 12 may use the same hardware as the normal node 20 or the specific node 30. A hardware switch is available for switching the same hardware. Further, instructions of BIOS (Basic Input Output System) may switch the function of the same hardware.

In recent years, as power-saving-oriented trend is rising, power-saving functions, based on coordination with hardware and software in a computer, have been realized. One of the functions is a function which transfers a CPU in an idle state from a normal state to a power-saving state.

In the patent document 1, the system controls a CPU therein so that each CPU transfers to the power-saving state on a CPU-by-CPU basis, in order to reduce power consumption. However, the patent document 1 does not disclose that the system controls each module so that each node transfers to the power-saving state on a node-by-node basis. When every CPU in a node transfers to the power-saving state, substantial power-saving effect is obtained if each module is controlled so that the module other than the CPU in the node transfers to the power-saving state.

Meanwhile, when access to the node occurs after the system transfers the module in the node to the power-saving state, the system needs to deal with the access by restoring the module in the node to the normal state. Accordingly, the system needs to cancel the power-saving state, every time the access to the node in the power-saving state from the node in the normal state occurs.

In the configuration disclosed in the patent document 1, the main memory device and/or the input-output device shared in the system connects with each of the nodes. Therefore, access to the main memory device and/or the input-output device may occur, even if every CPU in one node transfers to the power-saving state. In the system of the patent document 1, power consumption is not sufficiently reduced since the power-saving state of the node does not last for a long time, even if the node is controlled so that each node transfers to the power-saving state on a node-by-node basis.

An example of advantages of the invention is to sufficiently reduce power consumption by continuing, for a long time, the power-saving state reducing power consumption in the node.

The previous description of exemplary embodiments is provided to enable a person skilled in the art to make and use the present invention. Moreover, various modifications to these exemplary embodiments will be readily apparent to those skilled in the art, and the generic principles and specific examples defined herein may be applied to other embodiments without the use of inventive faculty. Therefore, the present invention is not intended to be limited to the exemplary embodiments described herein but is to be accorded the widest scope as defined by the limitations of the claims and equivalents.

Further, it is noted that the inventor's intent is to retain all equivalents of the claimed invention even if the claims are amended during prosecution.

The invention claimed is:

1. A computer system, comprising:
   a plurality of nodes each including one or more Central Processing Units (CPU), said nodes being connected with each other;
   a main memory device and an input-output device that are shared between said nodes and connect with any of said nodes; and
   a power control circuit,
   wherein said plurality of nodes include one or more normal nodes and one or more specific nodes, each one of said one or more normal nodes connects directly with said main memory device and with said input-output device and includes a crossbar switch for switching connections between said main memory device, said input-output device and said one or more specific nodes, and each one of said one or more specific nodes connects with said main memory device and with said input-output device through any one of said one or more normal nodes with no exception,
   and wherein said power control circuit controls each one of said one or more specific nodes so that said specific node transfers to a power-saving state in which power consumption may be reduced, and does not control said one or more normal nodes.

2. The computer system of claim 1, wherein when every CPU included in said one or more specific nodes transfers to said power-saving state, said power control circuit controls said one or more specific nodes so that each one of said one or more specific anodes transfers to said power-saving state.

3. The computer system of claim 2, wherein control software, operating on a master CPU that is one of said one or more CPUs included in any one of said one or more normal nodes, controls state transition of both said one of more CPUs included in said one or more normal nodes, said one or more CPUs included in said one or more specific nodes and said one or more specific nodes, and allocates a process so that said one or more CPUs included in said one or more specific nodes transfers to said power-saving state prior to said one or more CPUs included in said one or more normal nodes.

4. The computer system of claim 3, wherein said power control circuit includes a restoration circuit for controlling said one or more specific nodes so that said one or more specific nodes transfer from said power-saving state to a normal state, and said one or more CPUs included in said one or more specific nodes transfer from said power-saving state to a normal state.

5. The computer system of claim 1, wherein said power control circuit is included not in said one or more normal nodes but in said one or more specific nodes.

6. The computer system of claim 1, wherein each one of said one or more normal nodes includes a cache memory for temporarily storing data of said main memory device, said cache memory connecting with said one or more CPUs included in said one or more normal nodes, a main memory control circuit for controlling an interface of said main memory device, the crossbar switch, and wherein each one of said one or more specific nodes includes a second cache memory for temporarily storing data of said main memory device, said second cache memory connecting with said on one or more CPUs included in said specific nodes, and a second crossbar switch for switching a connection between said second cache memory and any one of said one or more normal nodes.

7. A method for controlling a computer system which comprises a plurality of nodes each including one or more Central Processing Units (CPU) and said nodes being connected with each other, and a main memory device and an input-output device that are shared between said nodes and connect with any of said nodes, said method comprising:
   judging whether or not one or more Central Processing Units (CPU) included in one or more specific nodes lies in a power-saving state in which power consumption may be reduced, each one of said one of more specific nodes being a node that connects with the main memory device and with the input-output device through any one of one or more normal nodes with no exception, each one of said one or more normal nodes being a node that connects directly with the main memory device and with the input-output device and includes a crossbar switch for switching connections between said main memory device, said input-output device and said one or more specific nodes; and
   controlling each one of said one or more specific nodes so that said each one of said one or more specific nodes transfers to said power-saving state, when every said one or more CPUs included in said one or more specific nodes lies in said power-saving state.

8. The method for controlling a computer system of claim 7, further comprising: allocating a process so that said one or more CPUs included in said one or more specific nodes transfers to said power-saving state prior to one or more CPUs included in said one or more normal nodes.

9. The method for controlling a computer system of claim 8, further comprising:
   judging whether or not any one of said one or more specific nodes lies in said power-saving state; and
   controlling each one of said one or more specific nodes so that said each one of said one or more specific nodes transfers from said power-saving state to a normal state when said each one of said one or more specific nodes lies in said power-saving state, and said any one or more CPUs of said one or more specific nodes transfers from said power-saving state to said normal state after said each one of said one or more specific nodes transfers to said normal state.

10. A computer-readable non-transitory recording medium storing thereon a program product, in a computer system which comprises a plurality of nodes each including one or more Central Processing Units (CPU) and said nodes being connected with each other, and a main memory device and an input-output device that are shared between said nodes and connect with any of said nodes, causing a computer to execute a step of judging whether or not one or more Central Processing Units (CPU) included in one or more specific nodes lies in a power-saving state in which power consumption may be reduced, each one of said one or more specific nodes being a node that connects with the main memory device and with the input-output device through any one of one or more normal nodes with no exception, each one of said one or more normal nodes being a node that connects directly with the main memory device and with the input-output device, and includes a crossbar switch for switching connections between said main memory device, said input-output device and said one or more specific nodes, and a step of controlling each one of said one or more specific nodes so that said each one of said one or more specific nodes transfers to said power-saving state, when every said one or more CPUs included in said one or more specific nodes lies in said power-saving state.

11. The computer-readable non-transitory recording medium of claim 10, further comprising a step of allocating a process so that said one or more CPUs included in said one or more specific nodes transfers to said power-saving state prior to one or more CPUs included in said one or more normal nodes.

12. The computer-readable non-transitory recording medium of claim 11, further comprising steps that are executed while said one or more CPUs included in said one or more specific nodes transfers from said power-saving state to said normal state, said steps comprising a step of judging whether or not any one of said one or more specific nodes lies in said power-saving state, a step of controlling each one of said one or more specific nodes so that said each one of said one or more specific nodes transfers from said power-saving state to said normal state when said each one of said one or more specific nodes lies in said power-saving state, and a step of controlling said each one of said one or more specific nodes so that any one of said one or more CPUs transfers from said power-saving state to said normal state after said each one of said one or more specific nodes is restored to said normal state.

* * * * *